(12) United States Patent
Bieringer

(10) Patent No.: US 7,729,785 B2
(45) Date of Patent: Jun. 1, 2010

(54) METHOD AND CONTROLLER FOR PROGRAM CONTROL OF A COMPUTER PROGRAM HAVING MULTITASKING CAPABILITY

(75) Inventor: Mathias Bieringer, Illingen (DE)

(73) Assignee: Robert Bosch GmbH, Stuttgart (DE)

( * ) Notice: Subject to any disclaimer, the term of this patent is extended or adjusted under 35 U.S.C. 154(b) by 2018 days.

(21) Appl. No.: 10/600,895

(22) Filed: Jun. 20, 2003

(65) Prior Publication Data

US 2004/0059772 A1  Mar. 25, 2004

(30) Foreign Application Priority Data

Jun. 27, 2002  (DE) .................... 102 29 676

(51) Int. Cl.
  *G05B 11/01* (2006.01)
  *G06F 9/46* (2006.01)
(52) U.S. Cl. .................... 700/12; 700/27; 718/102; 718/107
(58) Field of Classification Search .................... 700/19, 700/21, 86, 87, 276, 277, 1, 12, 23, 27; 718/102, 718/103, 107; 701/1, 101, 113; 709/200
See application file for complete search history.

(56) References Cited

U.S. PATENT DOCUMENTS

| 4,564,907 | A | * | 1/1986 | Mouri et al. ................. 701/113 |
| 5,086,385 | A | * | 2/1992 | Launey et al. ................. 700/83 |
| 5,646,843 | A | * | 7/1997 | Gudat et al. ................... 701/3 |
| 6,219,590 | B1 | | 4/2001 | Bemaden, III et al. |
| 6,260,058 | B1 | * | 7/2001 | Hoenninger et al. ........ 718/107 |
| 6,745,089 | B2 | * | 6/2004 | Rasmussen et al. ........... 700/28 |
| 7,085,692 | B2 | * | 8/2006 | Jackson et al. ................. 700/31 |
| 2002/0026249 | A1 | * | 2/2002 | Rasmussen et al. ........... 700/51 |

FOREIGN PATENT DOCUMENTS

| DE | 3872421 | 12/1992 |
| DE | 19500957 | 1/1996 |
| DE | 19924461 | 11/2000 |
| EP | 990966 | 4/2000 |

* cited by examiner

Primary Examiner—Charles R Kasenge
(74) Attorney, Agent, or Firm—Kenyon & Kenyon LLP

(57) ABSTRACT

A method and a controller are provided for controlling the execution of a computer program having multitasking capability on a computing element of a controller for controlling and/or regulating a system. The system may take up various possible system states. At the beginning of the execution of a function, the following steps may be executed: subdividing the computer program into a plurality of functionally linked functionalities; defining possible operating states for the functionalities; defining the possible system states of the system, in that specifiable operating states are allocated to the functionalities for each system state; ascertaining the dependencies of the functionalities upon one another, a first functionality dependent upon a second functionality if at least one input variable of the first functionality is ascertained in the second functionality; and centrally specifying the operating states required for a certain system state, taking into consideration the ascertained dependencies among the functionalities and further boundary conditions.

26 Claims, 4 Drawing Sheets

METHOD AND CONTROLLER FOR PROGRAM CONTROL OF A COMPUTER PROGRAM HAVING MULTITASKING CAPABILITY

BACKGROUND INFORMATION

The present invention relates to a method for program control of a computer program, having multitasking capability, on a computing element, especially a microprocessor, of a controller for controlling and/or regulating a system. The system may take up various possible system states.

The present invention also relates to a control program for program control of a computer program, having multitasking capability, on a computing element, especially a microprocessor, of a controller for controlling and/or regulating a system. The system may take up various possible system states. The control program is capable of being run on the computing element.

Finally, the present invention also relates to a controller for the control and/or regulation of a system which may take up various possible system states. The controller includes a computing element, especially a microprocessor, on which a computer program having multitasking capability may be run, and means for coordinating the execution of the computer program.

Conventionally, a computer program is used, for example, for controlling and/or regulating a driving dynamics system (a so-called electronic stability program, ESP) of a motor vehicle. The driving dynamics system may take up various possible system states. Possible system states are, for instance, normal operation (ESP_normal), a first limited operation (backup_ABS), in which a vehicle regulator (FZR) of the ESP is not functioning and only one antilock brake system (ABS) is functioning, a second limited operation (backup_EBD), in which only one system for the distribution of braking force (electronic brake distribution, EBD) is functioning, in order to prevent at least over-braking the wheels on the rear axle, and a faulty state (fail-safe), in which all essential safety functions of the ESP, in particular FZR, ABS and EBD have failed. In order to avoid driving situations that are critical to safety, the driver of the motor vehicle is notified, for instance acoustically or optically by the use of warning lights, of the various system states, but at least as regards the states in which only a limited or a faulty functioning still exists. The computer program is executable on a computing element, which is particularly designed as a processor, of a controller for controlling and/or regulating the driving dynamics system.

The conventional computer program for controlling and/or regulating the driving dynamics system is processed cyclically in a specified time pattern, i.e., only in a single time slice. The function references inside the computer program thus take place in a specified sequence, one after another. The sequence is specified so that the input variables of the functions are available before the execution of the latter. In the case of input variables which are computed from other functions, these other functions thus have to be carried out first, before that function can be carried out which needs the input variables computed in the other functions.

In addition, conventionally, one may execute computer programs for controlling and/or regulating a system on an operating system having multitasking capability, and instead of processing the computer program in a single time pattern, one may process it in various time patterns. This means, however, that the functions of the computer program no longer have to be processed in a strictly fixed sequence, but that now other precautions have to be taken so as to ensure that the input variables of the functions are available before the execution of the latter.

Various priorities are allocated to the functions of the computer program. A higher priority is assigned to functions relevant to safety than to other functions. Higher priority functions are carried out in shorter time patterns, i.e., in time patterns which are repeated more frequently, whereas less safety-relevant functions are processed at a lower priority in longer time patterns which are repeated less often. It must particularly be ensured that the input variables of the functions are always present at the right point in time, i.e., a function which is processed, for example, in a 5 ms time pattern and requires input variables from a 40 ms time pattern, is permitted to be executed only after the 40 ms time pattern has been processed, and the required input variables have been computed.

SUMMARY

An example embodiment of the present invention coordinates the execution of a computer program, having multitasking capability, in such a way that the input variables required for carrying out a function of the computer program are present with certainty at the beginning of carrying out the function.

In one embodiment, a method is provided which includes:
  subdividing the computer program into a plurality of functionally linked functionalities;
  defining possible operating states for the functionalities;
  defining the possible system states of the system, in that the functionalities have operating states allocated to them that are specifiable for each system state;
  ascertaining of dependencies of the functionalities on one another, a first functionality being dependent upon a second functionality if at least one input variable of the first functionality is ascertained in the second functionality; and
  centrally specifying the operating states required for a certain system state, taking into consideration the ascertained dependencies among the functionalities and further boundary conditions.

An example method according to the present invention for controlling the execution of a computer program having multitasking capability may make it possible flexibly and rapidly to control the computer program for controlling and/or regulating a system in various time slices of an operating system having multitasking capability by taking into consideration the existing dependencies of the functionalities among one another and further boundary conditions. Expanding the computer program by the addition of further functionalities is possible without any problem.

Thus, according to an example embodiment of the present invention, the computer program is subdivided into a plurality of functionally linked units, so-called functionalities. Permissible operating states are defined for each of the functionalities. The definition of the permissible operating states may be made, for example, based on practical experiences, based on simulations or based on theoretical considerations. Moreover, those system states are defined which the system is able to take up. Each system state is characterized by the fact that at least one functionality has a certain operating state, i.e., that at least one of the operating states takes up a specifiable value. For each system state, certain values are allocated to the operating states for the definition of the possible system states.

The functionalities of the computer program are subdivided into mutually dependent functionalities on the one hand, and into mutually independent functionalities on the other hand. Thus, for example, a first functionality is a function of a second functionality when at least one input variable of the first functionality is ascertained in the second functionality. The ascertained dependencies are stored in the controller, so that the ascertained dependencies are able to be accessed within the framework of the control of the execution of the computer program. For, according to the present invention, these dependencies of the individual functionalities on one another determine decisively the point in time at which a functionality is able to change from one operating state to another operating state, and thus, when the overall system is able to pass from one system state over into another system state.

As soon as all input variables of a certain functionality, by which a certain system state is characterized, are present, the operating state of this functionality is able to be changed. This applies also to all further functionalities by which the system state is additionally characterized. only when all functionalities have been changed to the corresponding operating state (and when possibly further specifiable boundary conditions are fulfilled), the system enters into the desired system state. Expressed in other words, the desired system state, or the operating states of the functionalities which characterize this system state, are specified centrally only when the ascertained dependencies between the functionalities and further boundary conditions have been satisfied.

According to one advantageous further refinement of the present invention, an operating state is defined by an operating state variable which is able to take up various operating state values. Thus, each functionality has an operating state variable allocated to it, which takes up different operating state values depending on the operating position. Depending on which operating state value the operating state variable of a functionality has, the functionality is available, for instance, in complete measure, in limited fashion or not at all.

The various operating states of a functionality may be conditional upon the fact that not all required input variables are available as yet, when the functionality is carried out. If, in such a case, it should not be possible to carry out corresponding functionalities for the computation of these input variables ahead of time, the functionality is executed using input variables which were ascertained with the aid of an alternative algorithm or by modeling from other variables. However, this may lead to the functionality not being available in full measure but only in a limited way. In case the missing input variables are not able to be modeled or otherwise computed, it may happen that the functionality is not available at all.

According to one example specific embodiment of the present invention, the operating state variable may take up operating state values corresponding to the settings "full functionality", "limited functionality" and "no functionality".

For taking into consideration the ascertained dependencies among the functionalities, the processing of the functionalities which characterize a certain system state may be staggered in time in such a way that the second functionality is processed before the first functionality, so as to ascertain the at least one input variable for the first functionality.

Alternatively, for taking into consideration the ascertained dependencies among the functionalities, the at least one input variable for the first functionality is not ascertained by processing the second functionality, but in another way. The other way of ascertaining the at least one input variable for the first functionality advantageously includes a modeling of the input variable from other variables, ascertaining a substitute variable and/or ascertaining the input variable with the aid of an alternative algorithm.

According to another advantageous further refinement of the present invention, the operating states may be specified by functionalities characterizing a certain system state as a function of at least one fault that has occurred in the system. Thus, according to this further refinement, fault conditions in the system are detected and localized. The faults that have occurred in the system have an effect on the selection and specification of a certain system state. Those input variables, on which the fault condition has an effect, are indicated correspondingly (input variable status signal). The selected system state and the status of the input variables is then taken into consideration for the selection and specification of the operating states of the individual functionalities which characterize the specified system state. A strategy is developed as to how the individual functionalities may be carried over into the operating states required for the selected system state, while taking into consideration the ascertained dependencies among the functionalities. When all the functionalities characterizing the system state have the required operating states, the transition of the system into the specified system state is finished.

According to another advantageous further refinement of the present invention, the operating states may be specified by functionalities characterizing a certain system state as a function of the actual operating states of the functionalities. According to this further refinement, the instantaneous actual system state is ascertained with the aid of the actual operating states of the functionalities. In addition, the actual operating state is taken into consideration during the control of the operating states among one another so that, for example, a new setpoint operating state is specified only when at least one other functionality has taken up a required operating state. In a driving dynamics system of a motor vehicle, for example, a new setpoint operating state is specified only when the operating state of an ABS controller has completed the transition of a limited to a full operativeness.

In addition, according to the present invention, two particularly advantageous uses of the example method according to the present invention for controlling the execution of a computer having multitasking capability are provided. On the one hand, using the method for controlling the execution of a computer program for controlling and/or regulating a system in a vehicle, especially a motor vehicle, is provided. On the one hand, using the method for controlling the execution of a computer program for controlling and/or regulating a driving dynamics system in a motor vehicle, is provided. On the other hand, using the method for controlling the execution of a computer program for controlling and/or regulating a system in a building is provided. In particular, using the method for controlling the execution of a computer program for controlling and/or regulating an alarm system, a heating or air conditioning system and/or an access control system in a building is proposed.

Particularly significant is the implementation of the method according to an example embodiment of the present invention in the form of a control program that is provided for the control and/or regulation of a system which is able to take up various possible system states. In this context, the control program is executable on a computing element, particularly on a microprocessor, of the controller and is suitable for carrying into effect the method according to the present invention. In this case, therefore, the present invention is implemented by way of the control program, so that the control program constitutes the present invention in the same way as the method for whose execution it is suitable. In this connection, it is preferred if the control program is stored on a storage element, especially on a read-only memory, a random access memory or on a flash memory.

Furthermore, an example controller according to the present invention may also include:

means for subdividing the computer program into a plurality of functionally linked functionalities;

means for defining permissible operating states of the functionalities;

means for defining the possible system states, these means allocating specifiable settings to each system state;

means for ascertaining of dependencies of the functionalities on one another, a first functionality being dependent upon a second functionality if at least one input variable of the first functionality is ascertained in the second functionality; and means for centrally specifying the operating states required for a certain system state, taking into consideration the ascertained dependencies among the functionalities, and further boundary conditions.

According to one advantageous further development of the present invention, the controller may have means for carrying out the method according to the present invention.

BRIEF DESCRIPTION OF THE DRAWINGS

Further features, uses and advantages of the present invention come to light from the following description of exemplary embodiments of the present invention which are shown in the drawings. In this context, all of the described or represented features, alone or in any combination, form the subject matter of the present invention, regardless of their formulation and representation in the specification and drawings, respectively.

DESCRIPTION OF EXAMPLE EMBODIMENTS

Figure 1:
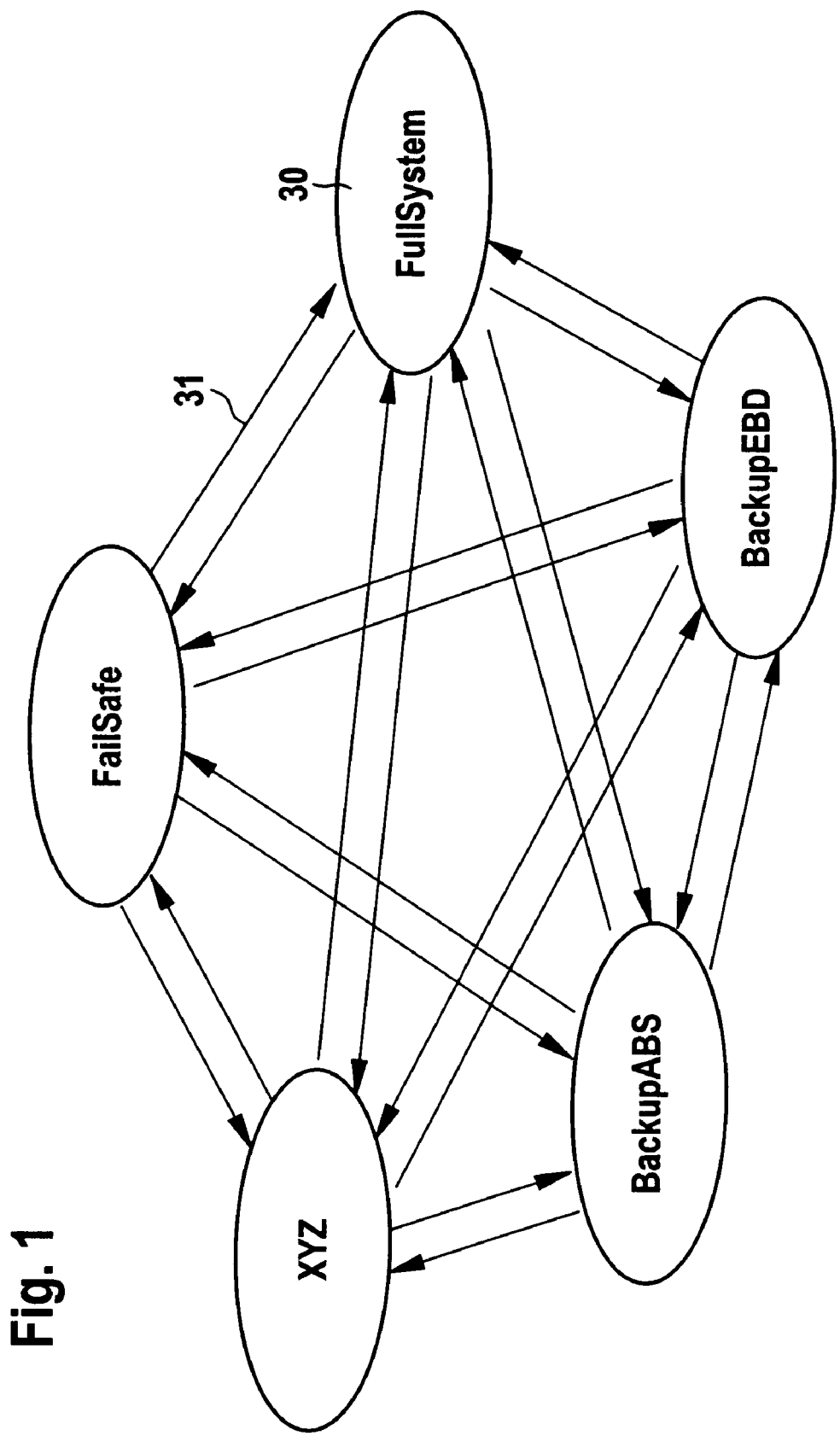
FIG. 1 shows various system states of a system.

The present invention relates to a computer program having multitasking capability for controlling and/or regulating a system. The computer program is executable on a computing element, particularly on a microprocessor, of a controller for controlling and/or regulating the system. The computer program having multitasking capability is processed in several different time patterns. The individual time patterns repeat cyclically, but viewed on the whole, the computer program is not processed cyclically.

The computer program is subdivided into a plurality of tasks, to which various priorities are allocated. Higher priorities are assigned to tasks having safety-relevant objectives than to tasks which have no safety-relevant objectives. The higher priority tasks are carried out in shorter time patterns, i.e., they are processed more frequently per time unit than the lower priority tasks.

The subdivision of the computer program into a plurality of tasks relates to the software-technological implementation of the computer program. On the functional plane, the computer program is subdivided into a plurality of functionally linked units, so-called functionalities. A functionality is able to include one or a plurality of tasks. In the case of a computer program for controlling and/or regulating a driving dynamics system (electronic stability programs, ESP) in a motor vehicle, functionalities are processed such as an antilock brake system (ABS), which prevents locking of the wheels during braking, or an automatic vehicle controller (FZR), which undertakes well-directed braking interventions at individual wheels, in order to maintain the driving dynamics of the motor vehicle.

On account of the fact that, in a computer program having multitasking capability, the function requests do not simply follow one another, and thus it cannot be simply ensured by the sequence of the requests that the input variables of a functionality have already been ascertained by a previously executed functionality, in the case of computer programs having multitasking capability, other precautions are taken so as to ensure that the required input variables are always correctly present for the functionalities to be executed. Thus, a functionality which is called up in a 5 ms task and which needs input variables from a 40 ms task, at the first call is executed only if the 40 ms task had already been computed.

One aspect of the present invention is that transition conditions are assigned to each of the system states or rather to each (permissible) transition from a first system state to a second system state, and the execution of the computer program is controlled in such a way that the system is carried over into the second system state only when all the transition conditions assigned to the transition into the second system state have been satisfied. If, for example, the transition condition is that all input variables are available to a functionality characterizing the second system state, then, in the light of the method according to the present invention it may be ensured that the overall system is indeed only carried over from the first system state into the second system state when all the required input variables are present.

The various system states 30 are shown in FIG. 1 by the example of a driving dynamics system (ESP). Among others, the following system states 30 are possible:

"full system": normal operation, full operability of the driving dynamics system;

"backup_ABS": antilock brake system (ABS) only, no vehicle controller (FZR) is active, limited operability;

"backup_EBD": only electronic brake distribution (EBD) active, limited operability;

"failsafe": FZR, ABS, EBD inactive, no operability of the system of any kind; and "XYZ": any other system state.

The transitions between the system states are marked with reference numeral 31.

Figure 2:
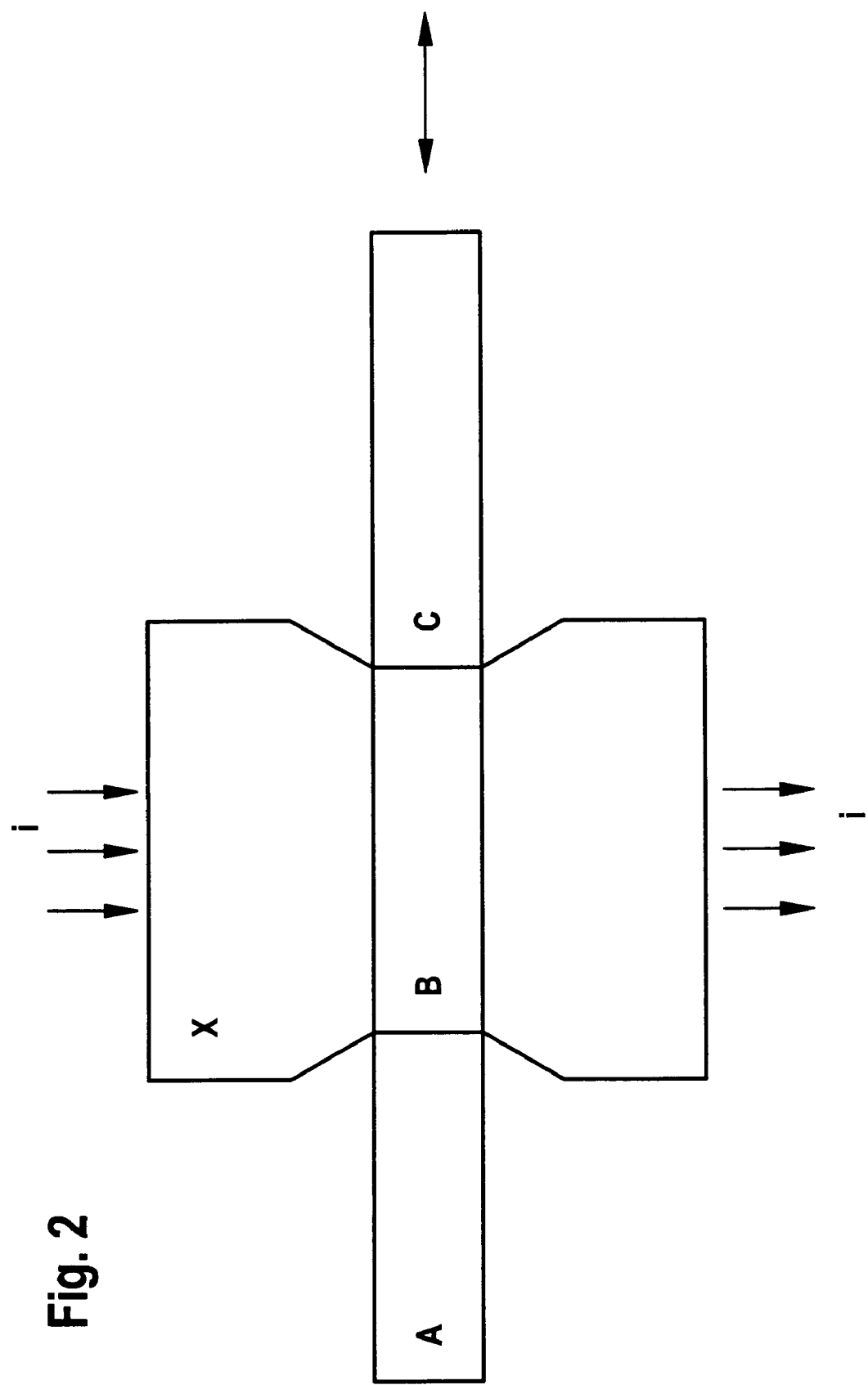
FIG. 2 shows a functionality of a computer program having multitasking capability for controlling and/or regulating a system.

In FIG. 2 a functionality X is shown, which has the input variables in_i and the output variables out_i. Between input variables in_i and output variables out_i a slider is provided that is able to be moved in the horizontal direction, which represents three different operating states A, B, C of functionality X. By sliding the slider, operating state A, B, C of functionality X may be changed.

The various system states 30 of the system are characterized by the fact that at least one of functionalities X of the system has a specifiable operating state A, B, C. The sum of operating states A, B, C of functionalities X thus yields corresponding system state 30 of the overall system. To each functionality X of the computer program an operating state variable is assigned, which may take up various operating state variables which respectively correspond to a certain operating state A, B, C of functionality X.

Switching a functionality X into another operating state A, B, C may, for example, be required when not all input variables in_i, required to execute functionality X, are present. At first one may try to delay the execution of this functionality X to the point that all required input variables in_i are present, i.e., until other functionalities X, in which the required input variables in_i were ascertained, have been executed. However, situations are possible in which delaying the execution of a functionality X, until all required input variables in_i are present, is not possible. In such a case, missing input variables in_i may also be modeled in the light of other variables, or may be computed by using an alternative algorithm. It is also possible, instead of the missing input variable in_i, to draw upon another variable which is already available, for executing functionality X. All these measures, however, which may be resorted to in case a required input variable in_i is not available, in the last analysis lead more or less to a limitation of the operability of the functionality, which is expressed by a change in operating state A, B, C.

Figure 3:
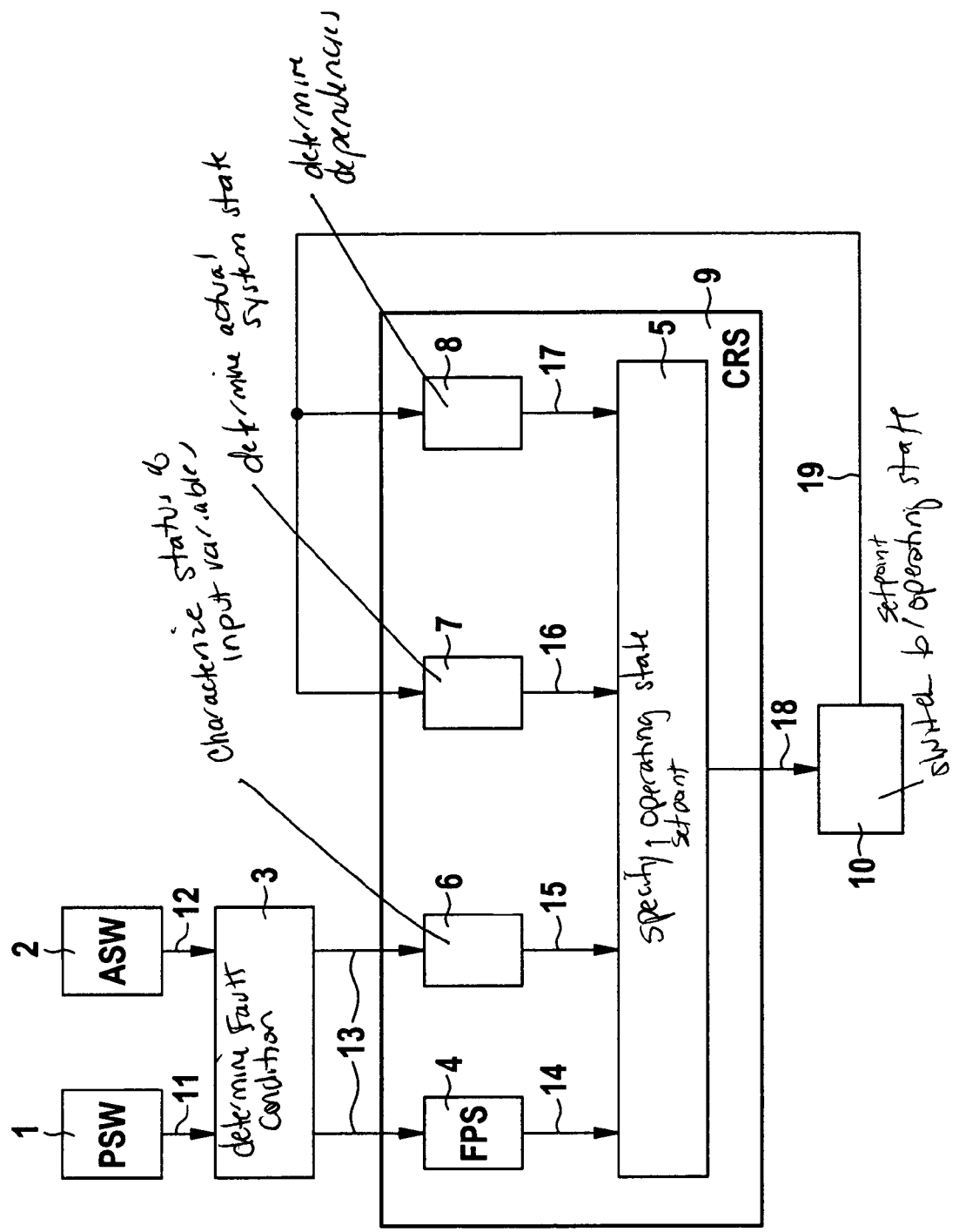
FIG. 3 shows a flow diagram of an example method according to the present invention.

In FIG. 3, a method is described for controlling the execution of a computer program having multitasking capability, for instance, in the light of a driving dynamics system in a motor vehicle. This method, and particularly the present invention may, however, be used for any system that is controlled and/or regulated by a computer program having multitasking capability. A further possibility for use, which is here addressed explicitly, is the use of the method according to the present invention for controlling the execution of a computer program for controlling and/or regulating an alarm system, a heating and air conditioning system and/or an access control system in a building, that is, the use of the method according to the present invention in the field of building management.

In a function block 1, the so-called platform software (PSW) is monitored. "Platform software" is the low-level part of the computer program for controlling and/or regulating the driving dynamics system. In a function block 2 the user software (ASW) is monitored. "User software" is, in the case of a driving dynamics system, the ABS regulation or the vehicle controller (FZR). Function blocks 1 and 2 are used to detect faults 11, 12 in the respective software components. A possible fault 11, 12, which could be detected in function blocks 1 and 2, would be a sensor fault which prevents a certain input variable in_i, which is required for the computation of a functionality X, from being available.

Faults 11, 12, detected in function blocks 1 and 2, are transmitted to a function block 3 which is implemented as a macro. In function block 3, in the light of faults 11, 12 ascertained in function blocks 1 and 2, a corresponding fault condition 13 of the system is determined. This fault condition is transmitted by function block 3 to a further function block 4, which is denoted as a failure processing system (FPS). While taking into consideration the ascertained fault conditions 13, in function block 4, an appropriate strategy for transition into the second system state, or more exactly, a strategy for targeted change of operating states A, B, C of the functionalities characterizing the second system state, is determined. Strategy 14, determined in function block 4, for switching operating states A, B, C of functionalities X to transition into the second system state, is transmitted to a function block 5. Stated more exactly, according to determined strategy 14, one after another, various setpoint operating states are transmitted, from function block 4 to function block 5, of those functionalities which characterize the second system state. Determined strategy 14 thus represents a setpoint system state, in the present exemplary embodiment the second system state.

Fault conditions 13, determined in function block 3, are also transmitted to a function block 6, in which the status of input variables in_i of functionalities X are characterized by setting a so-called invalid bit. For each input variable in_i of functionalities X of the computer program, its own status signal in the form of the invalid bit is provided. Thus, when in function blocks 1 or 2 a sensor fault 11, 12 has been detected, those input variables in_I, which are impaired by sensor fault 11, 12, are characterized appropriately by the setting or deleting of the invalid bit. Status signal 15 is also transmitted to function block 5.

In a function block 7, actual system state 16 is ascertained and is also transmitted to function block 5. As an example of a driving dynamics system, actual system state 16 includes the state of the driving dynamics system per se, but also the driving state of the motor vehicle. In a function block 8, the dependencies 17 of operating states A, B, C and the functionalities X are ascertained among one another. The dependencies 17 ascertained are also transmitted to function block 5.

In function block 5, setpoint operating states 18 are prepared as a function of the variables 14, 15, 16, 17 obtained from function blocks 4, 6, 7, 8. In particular, it is checked in function block 5 whether the operating state variables of functionalities X have the operating state values required for the second system state, i.e., whether the functionalities characterizing the second system state are in the required operating states. Function blocks 4 through 8 are summarized in a superordinated function block 9, which is denoted as a controller release system (CRS).

In case it is determined in function block 5 that the operating state variables have the required operating state values, i.e., that the functionalities, which characterize the second system state, are in the required system state, function block 5 specifies one or a plurality of setpoint operating states 18 and transmits these to a function block 10. In function block 10, the user software (ASW) and a security software (SIS) as well as an offset preparation is contained. The ASW corresponds to the controller part of the software (e.g. to the ABS, ASR or engine torque controller). The corresponding functionalities in function block 10 are then switched to setpoint operating state 18. Actual operating state 19 is transmitted from function block 10 to function blocks 7 and 8. There they are drawn upon for ascertaining the actual system state in function block 7 and for ascertaining the dependencies of functionalities X among one another in function block 8.

During the transition from one operating state A, B, C to another, in principle, two different kinds of transmission may be distinguished:

the transition from an operating state of a lower priority to an operating state of a higher priority as, for example, the transition from ABS_full system to ABS_off. This transition takes place directly, so that further, possibly faulty controls are not able to occur.

the transition from one operating state of a higher priority to an operating state of a lower priority as, for example, from ABS_off to ABS_full system. In this case, the transition from the setpoint operating state to the actual operating state is determined by the functionality itself. In this context, the actual operating state must remain fully functionable until the setpoint operating state has been reached. During the switch-over phase from the actual operating state to the setpoint operating state, both operating states are computed in parallel. Thus, the functionality itself determines when the transition is to take place. It should be noted that, during the transition phase, acoustical or optical warning instructions must further be output. On the part of the FPS (failure processing system) in function block 4, warning instructions are no longer output, since by one reset, faults 11, 12 detected in function blocks 1 or 2 were already reset.

Figure 4:
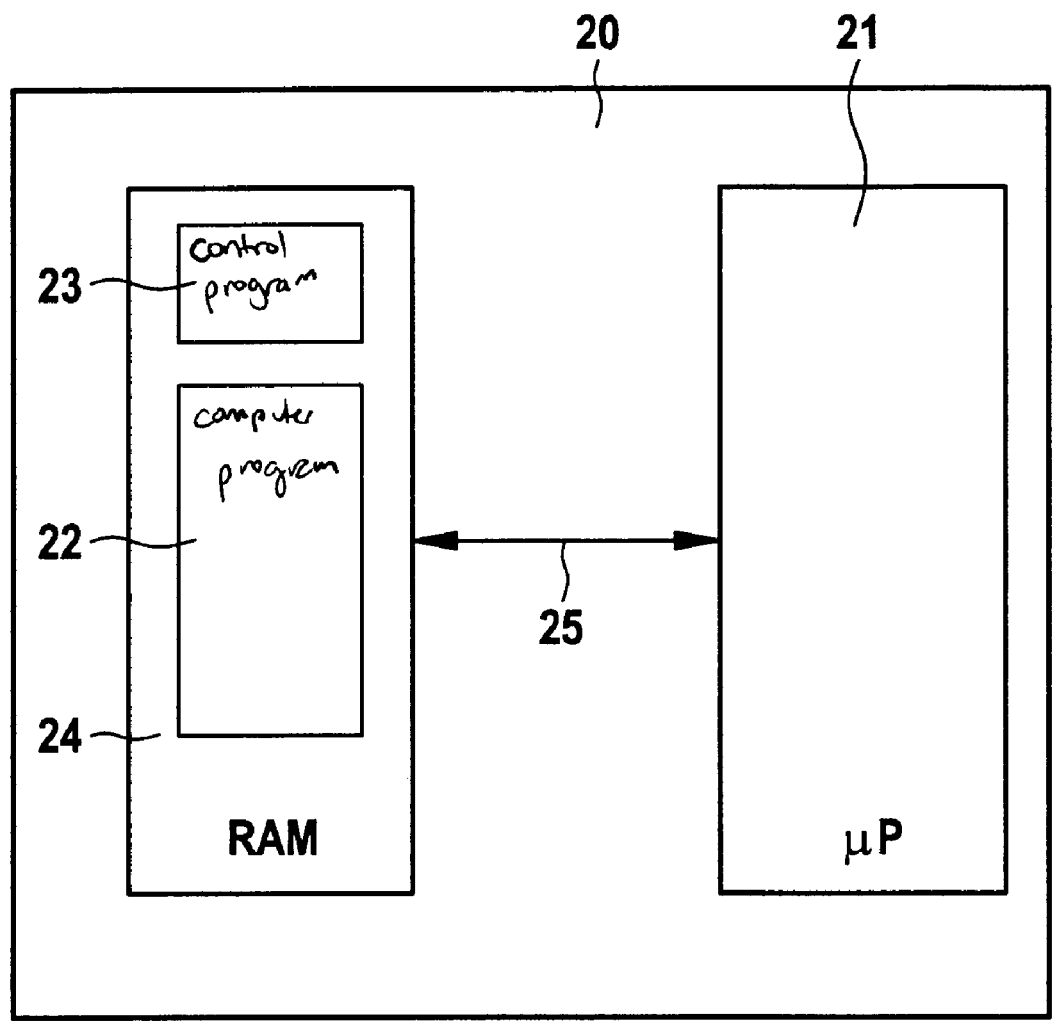
FIG. 4 shows a controller of the present invention according to one example embodiment.

In FIG. 4, a controller according to the present invention is designated in its entirety by reference numeral 20. Controller 20 is used for controlling and/or regulating a system which can take on various possible system states, particularly of a driving dynamics system in a motor vehicle. Controller 20 includes a computing element 21 that is configured as a microprocessor. On computing element 21, a computer program 22, having multitasking capability, is executable, which is subdivided into several functionally linked functionalities. Computer program 22 is used to control or regulate the system according to the present invention when it runs on computing element 21. Furthermore, in controller 20, means 23 are provided for the coordination of the execution of computer program 22. Means 23 are designed as a control program which is also executable on computing element 21. Computer program 22 and control program 23 are stored on a storage element 24, which, for example, is designed as a flash memory. In order to process computer program 22 and control program 23, these are transmitted to computing element 21 either in total or section by section via a data connection 25. In the same manner, results of computations that were carried out in computing element 21, or other data, may be transmitted to storage element 24 in the opposite direction via data connection 25, and stored there. Control program 23 is used for carrying out the example method according to the present invention when it is carried out on computing element 21.

What is claimed is:

1. A method for controlling the execution of a computer program, having multitasking capability, on a computing element of a controller for at least one of controlling and regulating a system that can take up various possible system states, comprising: performing the following operations with the computing element of the controller:
    subdividing the computer program into a plurality of functionally linked functionalities;
    defining possible operating states for the functionalities;
    defining possible system states of the system;
    allocating specifiable operating states to the functionalities for each system state;
    ascertaining dependencies of the functionalities on one another, a first functionality being dependent upon a second functionality if at least one input variable of the first functionality is ascertained in the second functionality; and
    centrally specifying the operating states required for a certain system state, taking into consideration the ascertained dependencies among the functionalities and further boundary conditions,
    wherein each of the operating states is defined by an operating state variable which is able to take up various operating state values, and
    wherein each of the operating state variables is able to take up operating state values corresponding to "full functionality", "limited functionality" and "no functionality" settings.

2. The method as recited in claim 1, wherein for taking into consideration the ascertained dependencies among the functionalities, the at least one input variable for the first functionality is ascertained in a way other than by processing the second functionality.

3. The method as recited in claim 2, further comprising:
    ascertaining the at least one input variable for the first functionality by at least one of modeling the input variable from other variables, ascertaining a substitute variable, or ascertaining the input variable with using an alternative algorithm.

4. The method as recited in claim 1, wherein the operating states are specified by the functionalities which characterize a certain system state, as a function of at least one fault appearing in the system.

5. The method as recited in claim 1, wherein the operating states are specified by the functionalities, which characterize a certain system state, as a function of actual operating states of the functionalities.

6. The method as recited in claim 1, further comprising:
    at least one of controlling and regulating a system in a vehicle using the computer program.

7. The method as recited in claim 6, wherein the vehicle is a motor vehicle.

8. The method as recited in claim 1, further comprising:
    at least one controlling and regulating a driving dynamics system in a motor vehicle using the computer program.

9. The method as recited in claim 1, further comprising:
    at least one of controlling and regulating a system in a building using the computer program.

10. The method as recited in claim 1, further comprising:
    controlling or regulating at least one of an alarm system, a heating system, air conditioning system or an access control system in a building using the computer program.

11. The method as recited in claim 1, wherein for taking into consideration the ascertained dependencies among the functionalities, the at least one input variable for the first functionality is ascertained in a way other than by processing the second functionality.

12. The method as recited in claim 11, further comprising:
    ascertaining the at least one input variable for the first functionality by at least one of modeling the input variable from other variables, ascertaining a substitute variable, or ascertaining the input variable with using an alternative algorithm.

13. A computer-readable storage medium storing a set of instructions for controlling a computer program having multitasking capability of a computing element of a controller for at least one of controlling and regulating a system that is able to take up various possible system states, the set of instructions capable of being executed on the computing element, comprising:
    a computer code arrangement having computer code for performing the following:
    subdividing the computer program into a plurality of functionally linked functionalities;
    defining possible operating states for the functionalities;
    defining possible system states of the system;
    allocating specifiable operating states to the functionalities for each system state;
    ascertaining dependencies of the functionalities on one another, a first functionality being dependent upon a second functionality if at least one input variable of the first functionality is ascertained in the second functionality; and
    centrally specifying the operating states required for a certain system state, taking into consideration the ascertained dependencies among the functionalities and further boundary conditions,
    wherein each of the operating states is defined by an operating state variable which is able to take up various operating state values, and
    wherein each of the operating state variables is able to take up operating state values corresponding to "full functionality", "limited functionality" and "no functionality" settings.

14. The storage medium as recited in claim 13, wherein the set of instructions is stored on one of a read-only memory, a random access memory, or on a flash memory.

15. A controller for at least one of controlling and regulating a system which is able to take up various possible system states, the controller including a computing element on which a computer program having multitasking capability is able to be run, comprising:
- a subdividing arrangement for subdividing the computer program into a plurality of functionally linked functionalities;
- a first defining arrangement for defining permissible operating states of the functionalities;
- a second defining arrangement for defining possible system states and allocating to the operating states specifiable settings for each system states;
- an ascertaining arrangement for ascertaining the functionalities depending on one another, a first functionality being dependent upon a second functionality if at least one input variable the first functionality is ascertained in the second functionality; and
- a specifying arrangement for centrally specifying the operating states required for a certain system state, taking into consideration the ascertained dependencies among the functionalities and further boundary conditions,
- wherein each of the operating states is defined by an operating state variable which is able to take up various operating state values, and
- wherein each of the operating state variables is able to take up operating state values corresponding to "full functionality", "limited functionality" and "no functionality" settings.

16. The controller as recited in claim 15, further comprising:
- a computing arrangement for executing the computer program.

17. A method for controlling the execution of a computer program, having multitasking capability, on a computing element of a controller for at least one of controlling and regulating a system that can take up various possible system states, comprising: performing the following operations with the computing element of the controller:
- subdividing the computer program into a plurality of functionally linked functionalities;
- defining possible operating states for the functionalities;
- defining possible system states of the system;
- allocating specifiable operating states to the functionalities for each system state;
- ascertaining dependencies of the functionalities on one another, a first functionality being dependent upon a second functionality if at least one input variable of the first functionality is ascertained in the second functionality; and
- centrally specifying the operating states required for a certain system state, taking into consideration the ascertained dependencies among the functionalities and further boundary conditions,
- wherein for taking into consideration the ascertained dependencies among the functionalities, staggering in time a processing of the functionalities which characterize the certain system state in such a way that the second functionality is processed before the first functionality, so as to ascertain the at least one input variable of the first functionality.

18. The method as recited in claim 17, wherein each of the operating states is defined by an operating state variable which is able to take up various operating state values.

19. The method as recited in claim 18, wherein each of the operating state variables is able to take up operating state values corresponding to "full functionality", "limited functionality" and "no functionality" settings.

20. The method as recited in claim 17, wherein the operating states are specified by the functionalities which characterize a certain system state, as a function of at least one fault appearing in the system.

21. The method as recited in claim 17, wherein the operating states are specified by the functionalities, which characterize a certain system state, as a function of actual operating states of the functionalities.

22. The method as recited in claim 17, further comprising:
- at least one of controlling and regulating a system in a vehicle using the computer program.

23. The method as recited in claim 22, wherein the vehicle is a motor vehicle.

24. The method as recited in claim 17, further comprising:
- at least one controlling and regulating a driving dynamics system in a motor vehicle using the computer program.

25. The method as recited in claim 17, further comprising:
- at least one of controlling and regulating a system in a building using the computer program.

26. The method as recited in claim 17, further comprising:
- controlling or regulating at least one of an alarm system, a heating system, air conditioning system or an access control system in a building using the computer program.

* * * * *